July 21, 1959    H. BARNETT    2,895,500
METERING VALVE
Filed Aug. 30, 1955    2 Sheets-Sheet 1
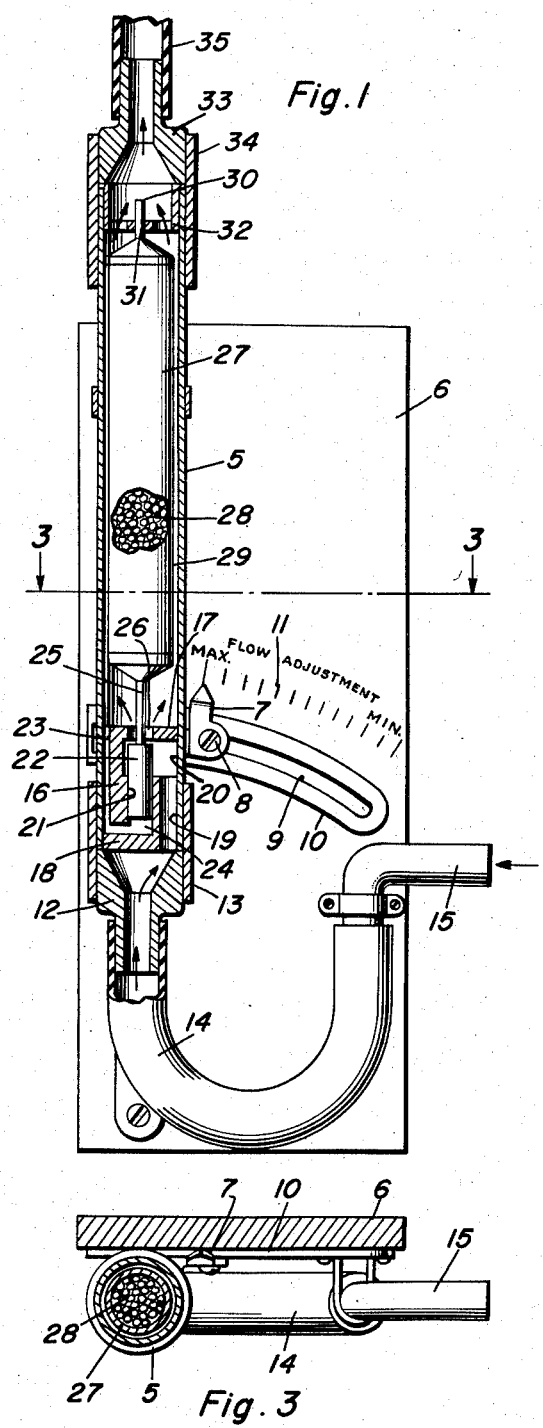
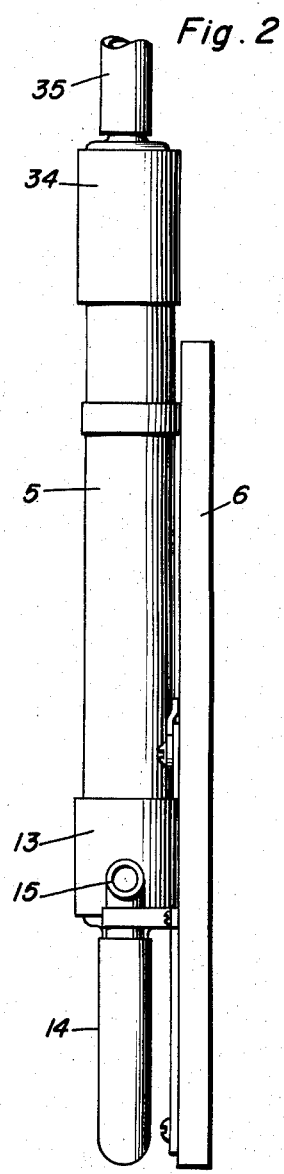
Harry Barnett
INVENTOR.

July 21, 1959
H. BARNETT
2,895,500
METERING VALVE
Filed Aug. 30, 1955
2 Sheets-Sheet 2
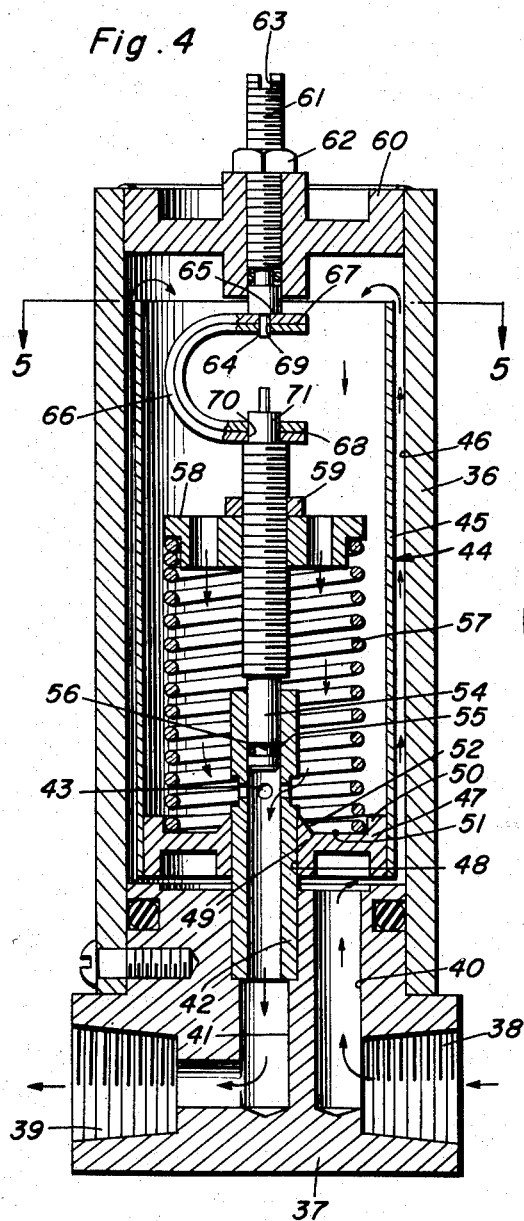
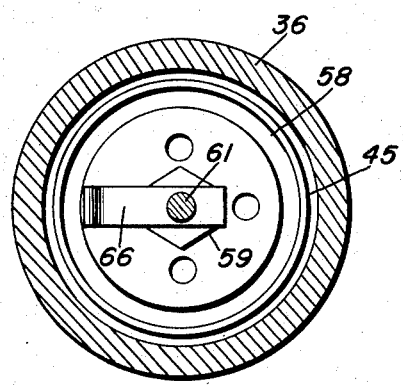
Harry Barnett
INVENTOR.
BY *Clarence A. O'Brien
and Harvey B. Jacobson*
Attorneys United States Patent Office 2,895,500
Patented July 21, 1959

2,895,500

METERING VALVE

Harry Barnett, Atlanta, Ga.

Application August 30, 1955, Serial No. 531,483

3 Claims. (Cl. 137—468)

The present invention relates to new and useful improvements in metering valves for use in dispensing carbonated beverages or other liquids.

An important object of the invention is to construct a valve of this character which will accurately dispense a predetermined quantity of liquid during variations in the supply pressure in the dispensing apparatus.

In apparatuses where a time controlled metering valve is employed, the time interval during which the valve remains open is usually fixed and no allowance is made for variations in the supply pressure leading to the valve and therefore the quantity of liquid dispensed by the valve will vary as the pressure varies. Accordingly, it is an object of the present invention to provide a metering valve which will automatically compensate for variations in the supply pressure to dispense a liquid in uniform quantities.

It is also an object of the invention to compensate for variations in viscosity of the liquid due to temperature changes.

Another object is to provide a metering valve of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view of the metering valve;

Figure 2 is a side elevational view;

Figure 3 is a transverse sectional view taken on a line 3—3 of Figure 1;

Figure 4 is a vertical sectional view of a modified valve construction; and

Figure 5 is a transverse sectional view taken on a line 5—5 of Figure 4.

Referring now to the drawings in detail, wherein for the purpose of illustration, I have disclosed a preferred embodiment of my invention, the numeral 5 designates a tubular cylinder supported in a vertical position on a backing panel 6 and tiltably adjusted by means of a pointer 7 fixed to the cylinder and provided with a set-screw 8 slidably engaged in an arcuate slot 9 of a bracket 10 which is suitably secured to the panel. The panel is provided with graduations 11 adjacent the pointer to indicate the angle of adjustment of the cylinder.

A reducing nipple 12 is secured to the lower end of the cylinder by a coupling collar 13 and a flexible hose 14 is sleeved onto the nipple and to which a supply pipe 15 is connected to supply liquid under pressure to the cylinder from a suitable source (not shown).

A valve housing 16 is suitably fixed in the lower end of the cylinder immediately above the nipple 12 and the housing is closed at its top and bottom, as shown at 17 and 18, respectively. A vertical passage 19 is formed eccentrically in the housing and extends upwardly from the bottom 18 to connect the nipple 12 with a chamber 20 in the upper portion of the housing. A central vertical cylindrical guide 21 is also formed in the housing and in which a cylindrical valve 22 is slidable with a working fit and a second eccentric passage 23 is formed in the housing and leads from the cylinder 5 above the housing to a lateral passage 24 which extends to the lower portion of guide 21 under the valve 22.

A stem 25 of reduced diameter extends upwardly from the top of valve 22 through an opening 26 in the top 17 of the valve housing and the opening forms a valve seat for the valve to prevent upward flow of liquid through passage 19 and chamber 20 into the lower portion of cylinder 5.

The upper end of stem 25 is connected to a hollow floating cylindrical piston 27 containing a variable quantity of shot or other weighted objects 28 and the sides of the piston are spaced from the walls of the cylinder 5 to form an annular by-pass passage 29 between the piston and the cylinder for the upward flow of liquid in the cylinder.

The upper end of the piston is provided with an upstanding guide pin 30 sliding in a central opening 31 in a spider or other suitable guide 32 secured in the upper end of the cylinder 5.

A reducing nipple 33 is also secured to the upper end of cylinder 5 by a coupling collar 34 and a flexible hose 35 is sleeved onto the nipple 33 to lead to a cut-off valve (not shown) for the liquid.

In the operation of the device, liquid under pressure enters the passage 19 and chamber 20 in the valve housing 16 and when the outlet for hose 35 is cut off, pressure in the cylinder 5 remains equalized above and below the piston 27 and the weight of the piston opens valve 22 to admit liquid into cylinder 5. Downstream pressure is imposed under valve 22 by way of passages 23 and 24 to balance the valve and make negligible the effect of valve area so that the valve will give balanced action.

When the outlet for hose 35 is opened to dispense the liquid, the flow in cylinder 5 will raise piston 27 and valve 22 will enter opening 26 to cut off flow from chamber 20, thus metering the quantity of liquid dispensed.

The cylinder 5 may be tilted at a desired angle to vary the flow in the cylinder to compensate for varying installation conditions.

The modified construction illustrated in Figures 4 and 5 comprises a cylindrical casing 36 in the lower end of which a fitting 37 is suitably secured and the fitting is formed with internally threaded inlet and outlet ports 38 and 39 therein and to which a supply pipe and an outlet pipe (both not shown) are respectively attached. A passage 40 in the fitting leads to the lower portion of casing 36 from the inlet port 38 and an outlet passage 41 leads to the outlet port 39 from a tube 42 which is fixed in the upper portion of the passage 41 and extends upwardly from the fitting centrally into the lower portion of the casing. One or more ports 43 are formed in the upper portion of tube 42.

A tubular floating member is designated generally at 44 and includes a tube 45 which is spaced centrally inside casing 36 to form a restricted circular passage 46 surrounding the member. The lower end of tube 45 is closed by an annular valve 47 suitably fixed inside said tube and the valve is formed with a central opening 48 for close fitting sliding movement on tube 42 below ports 43. The upper surface of valve 47 is formed with inner and outer annular flanges 49 and 50 defining an annular channel 51 between said flanges, and inner flange 49 is beveled, as shown at 52, so that the liquid when entering ports 43 will not be retarded.

A stem 54 is slidable at its lower end in the upper end of tube 42 and is provided with a sealing ring 55 engaged in a circumferential groove 56 in the stem. A coil compression spring 57 has its lower end seated in channel 51 of valve 47 and bearing against said valve the upper end of the spring bears against a washer 58 which is slidable on the stem and a nut 59 is threaded on the stem above the washer to adjust the tension of the spring.

The upper end of casing 36 is closed by a cap 60 having a vertical adjusting screw 61 threaded downwardly through the center of the cap and provided with a lock nut 62 on top of the latter. The upper end of the screw 61 is formed with a screwdriver slot 63.

The lower end of screw 61 is formed with a reduced stem 64 which forms a shoulder 65 on the screw and a U-shaped bimetallic member 66 is positioned with its leg portions 67 and 68 one above the other in the upper portion of tube 45. The uppermost leg portion 67 bears against shoulder 65 at the lower end of screw 61 and is formed with an opening 69 in which the stem 64 is rotatable. Lower leg portion 68 of the bimetallic member is also formed with an opening 70 to receive a reduced stem 71 at the upper end of stem 54.

The basic operating principle of the modified construction is the same as the device first described above. That is, it makes use of an annular by-pass passage 46 formed by a floating tubular member 44 and which is responsive to the flow of liquid to meter the flow by automatically controlling the valve 47.

The path of the liquid is indicated by the arrows in Figure 4, and instead of the piston being balanced by the weight thereof, as in Figure 1, it is balanced by the spring 57. This allows installation of the valve in any position. Coarse adjustment of the flow is obtained by adjusting nut 59 to adjust the compression of spring 57 and fine adjustment is obtained by adjusting screw 61.

The device operates to maintain constant flow with variable pressure by automatically adjusting the area of the ports 43 in the tube 42 so that the pressure drop across cylinder 45 balances the spring 57. Compensation for variations in viscosity due to temperature changes is obtained by response of bimetallic member 66 the open ends thereof moving close together with increase in temperatures thus reducing compression of the spring 57 and causing a corresponding reduction in the pressure drop required to balance out the spring. The net result is that the flow remains constant even though the pressure drop has changed due to change in viscosity.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A metering valve comprising an upright hollow cylinder having a fitting in its lower end provided with a liquid inlet to said cylinder and with an outlet from said cylinder, an upright tubular member in said cylinder spaced therefrom to provide a restricted by-pass passage surrrounding the tubular member to create a flow in the cylinder around and downwardly into the tubular member, a tube rising from said outlet into the tubular member and having side inlet ports therein for passage of liquid from the cylinder to said outlet, a valve member fixed in the lower end of the tubular member and vertically slidable on said tube to vary the area of said ports in response to variations in the volume of flow, and thermally responsive biasing means in said tubular member exposed to liquid therein and connected to said valve member for variably opposing upward closing movement of said valve member to compensate for variations in the volume of flow resulting from variations in viscosity of the liquid incident to changes in temperature of the liquid.

2. A metering valve as in claim 1, said thermally responsive biasing means comprising a compression spring in said tubular member opposing upward closing movement of the valve member, and a bimetallic member in said tubular member operatively connected to said spring to vary the compression exerted thereby in response to changes in temperature of the liquid.

3. A metering valve as in claim 1, and settable means for varying the operation of said bimetallic member.

References Cited in the file of this patent

UNITED STATES PATENTS

| 77,865 | Brettell | May 12, 1868 |
| 209,021 | Chamberlain | Oct. 15, 1878 |
| 550,231 | Smith | Nov. 19, 1895 |
| 1,813,122 | Moore | July 7, 1931 |
| 1,876,552 | Bleecher | Sept. 13, 1932 |
| 1,972,908 | Shaw | Sept. 11, 1934 |
| 2,136,460 | Peteler | Nov. 15, 1938 |
| 2,202,099 | Gillen | May 28, 1940 |
| 2,658,522 | Coberly | Nov. 10, 1953 |

FOREIGN PATENTS

| 115,819 | Austria | of 1930 |
| 827,828 | France | of 1938 |